US009081428B2

(12) United States Patent
Liu

(10) Patent No.: US 9,081,428 B2
(45) Date of Patent: Jul. 14, 2015

(54) APPARATUS AND METHOD FOR IMPACT RESISTANT TOUCHSCREEN DISPLAY MODULE

(75) Inventor: Jin Liu, Mississauga (CA)

(73) Assignee: PSION INC., Mississauga, Ontario (CA)

( * ) Notice: Subject to any disclaimer, the term of this patent is extended or adjusted under 35 U.S.C. 154(b) by 564 days.

(21) Appl. No.: 13/011,264

(22) Filed: Jan. 21, 2011

(65) Prior Publication Data

US 2011/0260993 A1    Oct. 27, 2011

Related U.S. Application Data

(63) Continuation-in-part of application No. 12/765,945, filed on Apr. 23, 2010, now abandoned.

(51) Int. Cl.
G06F 3/041 (2006.01)
G06F 1/16 (2006.01)
H04M 1/02 (2006.01)
H04M 1/18 (2006.01)

(52) U.S. Cl.
CPC .............. *G06F 3/041* (2013.01); *G06F 1/1643* (2013.01); *G06F 1/1656* (2013.01); *G06F 2203/04103* (2013.01); *H04M 1/0266* (2013.01); *H04M 1/185* (2013.01); *H04M 2250/22* (2013.01); *Y10T 29/49002* (2015.01)

(58) Field of Classification Search
CPC ..... G06F 3/041; G06F 3/0412; G06F 3/0414; G06F 3/044–3/047
USPC ................................. 345/173–179
See application file for complete search history.

(56) References Cited

U.S. PATENT DOCUMENTS

| 5,479,285 | A |  | 12/1995 | Burke |
| 5,710,607 | A |  | 1/1998 | Iwamoto et al. |
| 6,040,846 | A |  | 3/2000 | Stanton et al. |
| 6,088,069 | A |  | 7/2000 | Farlow |
| 6,871,138 | B1 |  | 3/2005 | Minelli |
| 8,520,373 | B2 | * | 8/2013 | Liu .......................... 361/679.03 |
| 2002/0105686 | A1 | * | 8/2002 | Hasegawa et al. ............ 358/498 |
| 2003/0132917 | A1 |  | 7/2003 | Yuen |
| 2004/0112143 | A1 |  | 6/2004 | Richardson |
| 2004/0160422 | A1 | * | 8/2004 | Choi et al. ..................... 345/173 |
| 2004/0164966 | A1 |  | 8/2004 | Lee |
| 2005/0280746 | A1 | * | 12/2005 | North et al. ..................... 349/12 |
| 2006/0012578 | A1 | * | 1/2006 | Ohtake ......................... 345/173 |
| 2006/0022952 | A1 |  | 2/2006 | Ryynanen |

(Continued)

FOREIGN PATENT DOCUMENTS

EP       1691593 A1    8/2006
WO    2006105274 A2   10/2006

OTHER PUBLICATIONS

Non Final Office Action mailed Jun. 26, 2012 in counterpart U.S. Appl. No. 13/011,264, Jin Liu, filed Apr. 23, 2010.

(Continued)

*Primary Examiner* — Alexander Eisen
*Assistant Examiner* — Nelson Lam

(57) ABSTRACT

A method and apparatus for an impact resistant touchscreen display module, such as for use in ruggedized mobile computing and display devices. The structure provided also allows for severability of the touchscreen and display screen portions, enhancing the practicability of replacing individual components for repair of a damaged touchscreen display module.

13 Claims, 3 Drawing Sheets

(56) References Cited

U.S. PATENT DOCUMENTS

| | | |
|---|---|---|
| 2006/0054335 A1 | 3/2006 | Rapp et al. |
| 2006/0061859 A1 | 3/2006 | Chen et al. |
| 2006/0109254 A1 | 5/2006 | Akieda et al. |
| 2006/0181522 A1 | 8/2006 | Nishimura et al. |
| 2009/0009945 A1 | 1/2009 | Johnson et al. |
| 2009/0096756 A1 | 4/2009 | Lube |
| 2009/0290087 A1 | 11/2009 | Bauer, Jr. et al. |
| 2010/0053854 A1* | 3/2010 | Nishikawa et al. ...... 361/679.01 |
| 2010/0110033 A1* | 5/2010 | Sakai ........................... 345/173 |
| 2010/0201640 A1* | 8/2010 | Nozawa et al. ............... 345/173 |
| 2011/0001712 A1* | 1/2011 | Saito ............................. 345/173 |
| 2011/0018695 A1 | 1/2011 | Bells et al. |
| 2011/0128236 A1 | 6/2011 | Faubert |
| 2012/0062492 A1* | 3/2012 | Katoh ........................... 345/173 |

OTHER PUBLICATIONS

European Search Report dated Jul. 22, 2014 in related European patent application 10194448.6-1972/2381342 filed Dec. 10, 2010.

* cited by examiner

APPARATUS AND METHOD FOR IMPACT RESISTANT TOUCHSCREEN DISPLAY MODULE

CROSS REFERENCE TO RELATED APPLICATION

This application is a Continuation in Part of U.S. application Ser. No. 12/765,945 filed on Apr. 23, 2010, now abandoned and claims priority thereto. The subject matter of said U.S. application Ser. No. 12/765,945 is hereby incorporated by reference in its entirety.

TECHNICAL FIELD

The present invention relates generally to a method and apparatus for an impact resistant touchscreen display module, for use in computing and display devices, including mobile devices and the like.

BACKGROUND

Given the proliferation of mobile devices, ruggedization has become an important factor in enhancing their usefulness. It is expected that mobile devices will, in normal usage, be dropped from time to time during handling for example. This introduces an additional factor of vulnerability and thus, to the extent that the mobile device may be made more robust and reliable when subjected to inadvertent physical abuse in normal usage, the utility to a user of such devices is enhanced.

Screen display assemblies incorporating a touch-sensitive panel, or touchscreen, overlaying a display screen are known. Touchscreens are especially desirable for use in mobile devices, where keyboard and mouse systems do not allow a satisfactory, intuitive, rapid, or accurate interaction by the user with the display's content. The touchscreen enables one to interact directly with the information displayed on the display screen, rather than indirectly in the case of a mouse or touchpad. Secondly, a user may interact in that manner without need for any intermediate device such as a stylus that needs to be held in the hand. Touchscreen panels are commonly overlayed on display screens of mobile devices such as mobile computers, PDAs, cell phones and smartphones to form display screen modules and these modules typically represent the most expensive components of a mobile device. Furthermore, as the components of the display screen module are conventionally bonded together during assembly of the display screen module, typically using optically clear adhesive, the entire display screen module must be discarded if the relatively brittle display screen is damaged due to a physical impact, etc.

Consequently, a solution which enhances the resistance or robustness of the display screen module to physical impact, and even further, allows severability of the touchscreen and display screen during any repair would be advantageous. It is desired to provide an impact-resistant touchscreen display module, embodied in a structure which does not add physical bulk and complexity, to mobile devices.

SUMMARY OF THE INVENTION

Accordingly, the present invention provides a touchscreen display module for use in a graphical user interface of a mobile device comprising: a touchscreen panel having a generally planar disposition, the touchscreen panel comprising a touch-sensitive region surrounded by a non-touch sensitive periphery, the touch-sensitive region comprising a substantial portion of the touchscreen panel; a rigid spacer underlaying the non-touch sensitive periphery of the touchscreen panel, the rigid spacer securely disposed in contact with non-touch sensitive periphery of the touchscreen panel by an adhesive layer; a compliant layer underlaying the rigid spacer, the compliant layer disposed in contact with the rigid spacer; a display screen underlaying the compliant layer, the display screen having a generally planar display portion provided to directly underlay the touch-sensitive region of the touchscreen; and a touchscreen housing assembly comprising a base bezel portion and a top bezel portion, the touchscreen housing assembly adapted to securely frame the display screen, the compliant layer, the rigid spacer, and the touchscreen panel.

Also provided is a mobile device comprising a processor; a memory coupled to the processor having instructions stored therein for execution by the processor; a touchscreen display module for displaying graphical images processed by the processor using the instructions stored in the memory, the touchscreen display module comprising: a touchscreen panel having a generally planar disposition, the touchscreen panel comprising a touch-sensitive region surrounded by a non-touch sensitive peripheral region, the touch-sensitive region comprising a substantial portion of the touchscreen panel; a rigid spacer shaped to underlay the non-touch sensitive peripheral region of the touchscreen panel; a compliant layer underlaying the rigid spacer, the compliant layer disposed in contact with the rigid spacer; a display screen underlaying the compliant layer, the display screen having a generally planar display portion provided to directly underlay the touch-sensitive region of the touchscreen; and a touchscreen housing assembly comprising a base bezel portion and a top bezel portion, the touchscreen housing assembly adapted to securely frame the display screen, the compliant layer, the rigid spacer, and the touchscreen panel.

Also provided is a method for assembling a touchscreen display module comprising providing a touchscreen panel having a generally planar disposition, the touchscreen panel comprising a touch-sensitive region surrounded by a non-touch sensitive periphery, the touch-sensitive region comprising a substantial portion of the touchscreen panel; providing a rigid spacer underlaying the non-touch sensitive periphery of the touchscreen panel, the rigid spacer securely disposed in contact with non-touch sensitive periphery of the touchscreen panel by an adhesive layer; providing a compliant layer underlaying the rigid spacer, the compliant layer disposed in contact with the rigid spacer; providing a display screen underlaying the compliant layer, the display screen having a generally planar display portion provided to directly underlay the touch-sensitive region of the touchscreen; and providing a touchscreen housing assembly comprising a base bezel portion and a top bezel portion, the touchscreen housing assembly adapted to securely frame the display screen, the compliant layer, the rigid spacer, and the touchscreen panel.

BRIEF DESCRIPTION OF THE DRAWINGS

Embodiments of the present invention will now be described, by way of example only, with reference to the following drawings in which.

DETAILED DESCRIPTION

As used herein, the term mobile device is intended to include, without limitation, handheld computers, personal digital assistants, smartphones, handheld game systems, industrial data input devices such as bar code scanners and/or RFID readers, data display devices such as digital messaging systems, etc.

Figure 1:
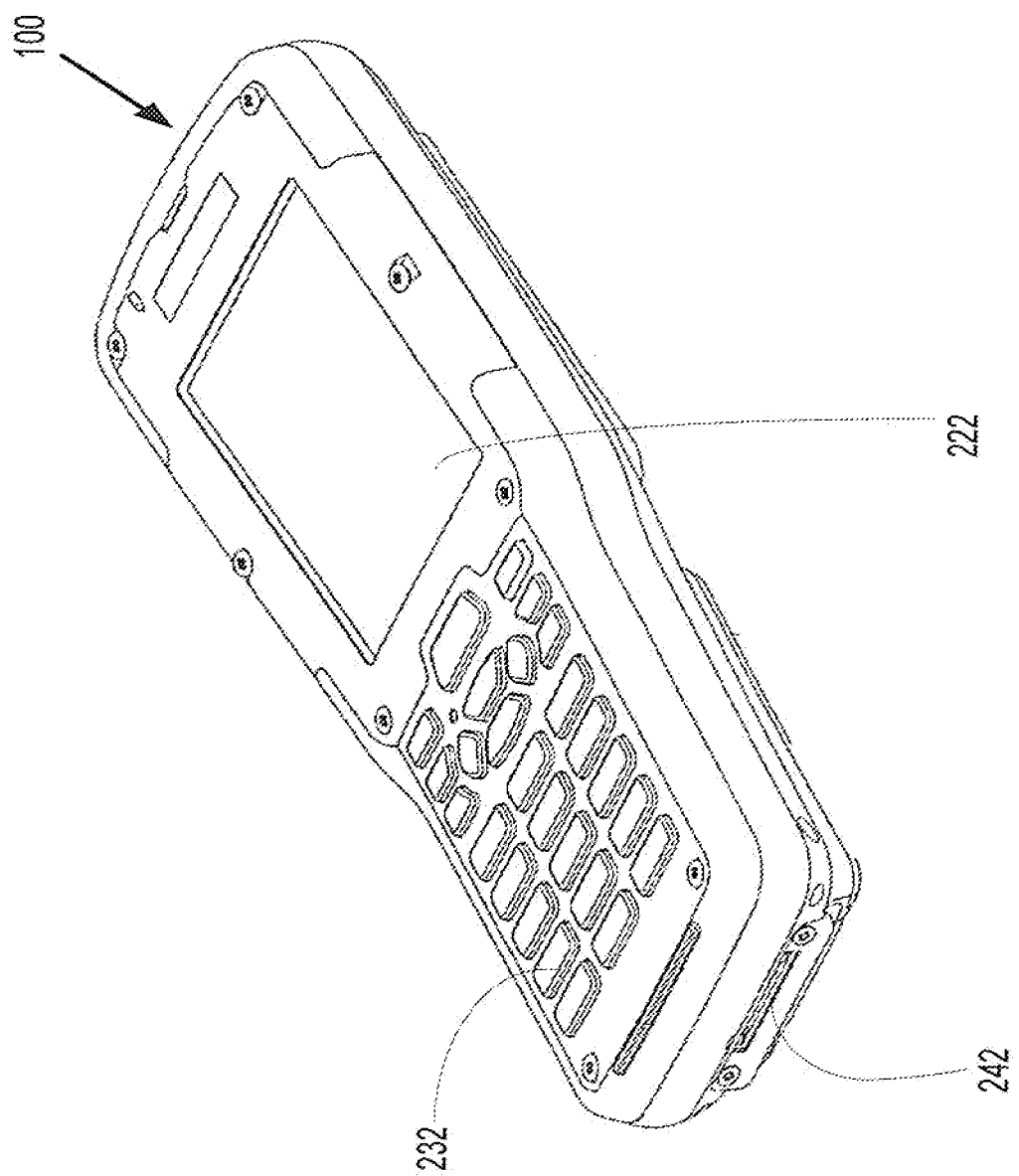
FIG. 1 shows a perspective view of a mobile device having an impact resistant touchscreen display module in accordance with the present invention.

Referring now to the accompanying figures, FIG. 1 illustrates an exemplary embodiment of a mobile device 100 in accordance with the present invention. Mobile device 100 may have the capability of communicating at least data, and possibly both data and voice communications, to and from appropriate servers as well as data acquisition sources within a communication network. As described in more detail below, mobile device 100 can include an impact resistant touchscreen display module 222.

Figure 2:
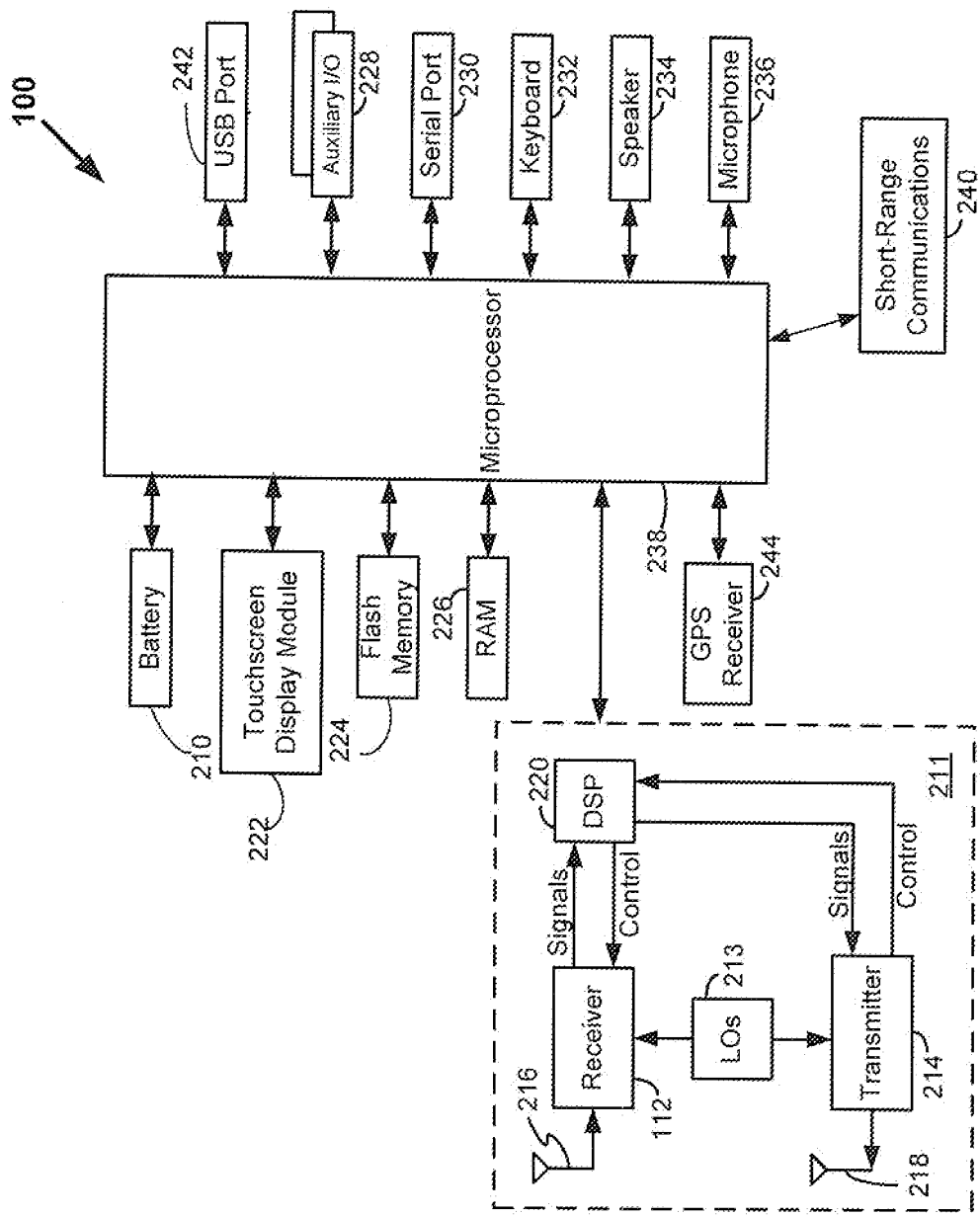
FIG. 2 is a block diagram of the electronic components and functional subsystems of the mobile device of FIG. 1.

Referring now to FIG. 2, the mobile device 100 may include a radio frequency (RF) communication subsystem 211, which includes a receiver 112, a transmitter 214, and associated components, such as one or more external or internal antenna elements 216 and 218, local oscillators (LOs) 213, and a processing module such as a digital signal processor (DSP) 220. As will be apparent to those skilled in field of RF communications, the particular design of the RF communication subsystem 211 depends on the communication network in which mobile device 100 is intended to operate, but may include communication functionalities such as radio-frequency identification (RFID), Wi-Fi WLAN based on 802.11 standards, GSM or CDMA cellular, and the like.

The mobile device 100 also includes a microprocessor 238 which controls general operation of the mobile device 100. The microprocessor 238 also interacts with functional device subsystems such as touchscreen display module 222, a flash memory 224, random access memory (RAM) 226, auxiliary input/output (I/O) subsystems 228, serial port 230, keyboard 232, speaker 234, microphone 236, short-range communications subsystem 240 such as a Bluetooth™ transceiver for example, and Universal Serial Bus (USB) expansion port 242 for peripherals. The mobile device 100 may include a power source 210, such as a rechargeable battery which may also be removable and replaceable from the mobile device. The mobile device 100 may also include a positioning device 244, such as a GPS receiver, for receiving positioning information.

Display module 222 and keyboard 232 together constitute the graphical user interface of mobile device 100, with output to the user being displayed on the display screen of display module 222 and user input being received from keyboard 232 and/or the touchscreen of display module 222. As will be apparent to those of skill in the art, mobile device 100 can include additional components and/or functions in its user interface, if desired.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the mobile device 100. A predetermined set of applications, which control basic device operations, may be installed on the mobile device 100 during its manufacture. These basic operations typically include data and voice communication applications, for example. Additionally, applications may also be subsequently loaded onto the mobile device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the mobile device 100 and may provide enhanced on-device features, communication-related features, or both.

Touchscreen display module 222 is used to visually present an application's graphical user interface (GUI) to the user. The user can manipulate application data by modifying information on the GUI using direct touches of a finger or a suitable stylus. Depending on the type of mobile device 100, the user may also have access to other types of input devices, such as, for example, a scroll wheel, trackball, light pen or other touch sensitive screen.

Figure 3:
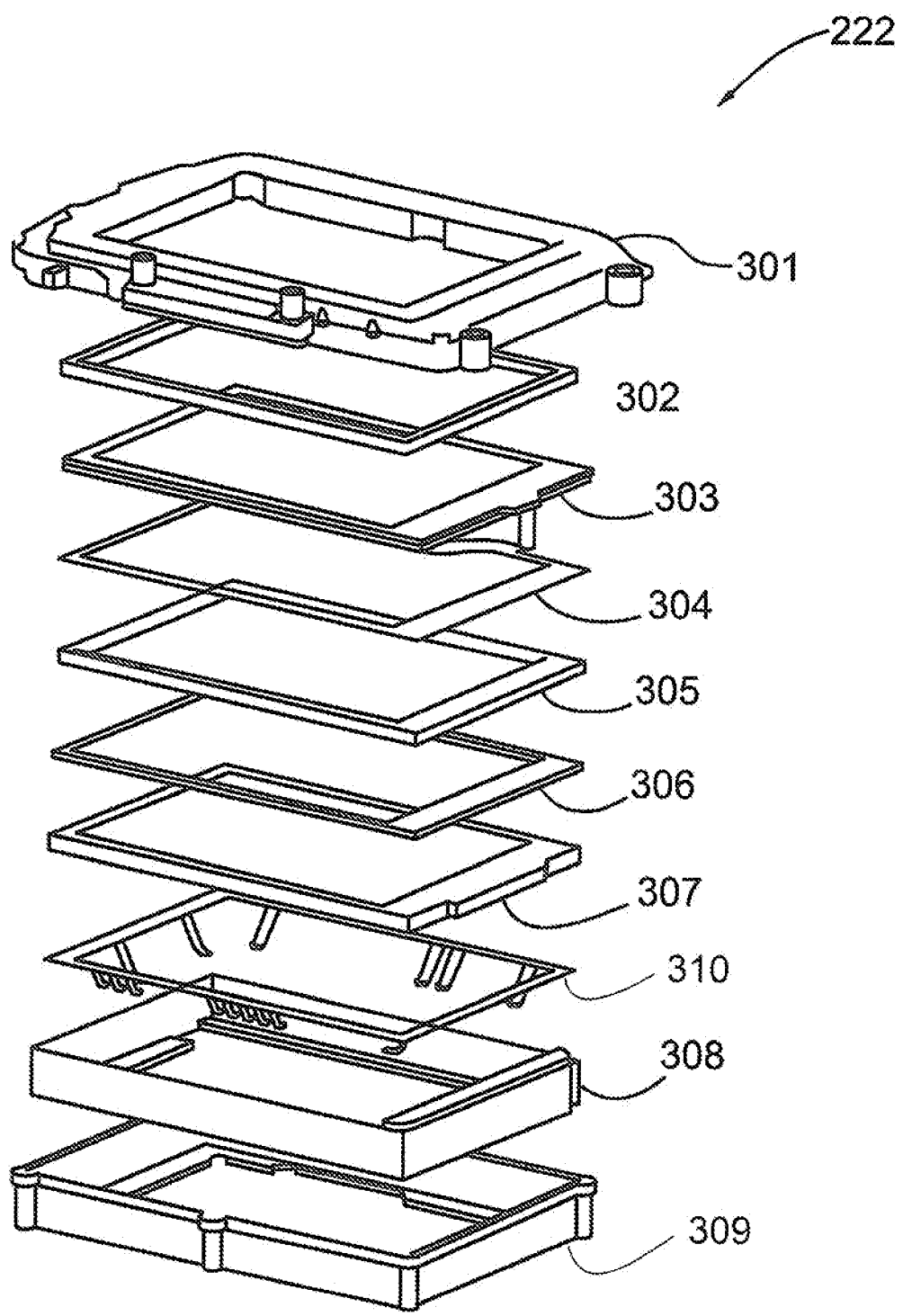
FIG. 3 is an exploded view of an assembly of components of the impact resistant touchscreen display module employed in the mobile device of FIG. 1.

FIG. 3 illustrates an exemplary structuring of sub-assembly components of the impact resistant touchscreen display module which may be incorporated into the mobile device 100 or the like.

Touchscreen display module 222 may be structured and assembled as follows. A touchscreen panel 303 of a generally planar disposition comprises a touch-sensitive region surrounded by a non-touch sensitive periphery. Typically, both the touch-sensitive region and its non-touch sensitive periphery are rectangular in shape; however, other shapes and even irregular geometries are contemplated. The touch-sensitive region comprises the majority of the area of the touchscreen panel 303, relative to the non-touch sensitive periphery. The touch-sensitive region of touchscreen panel 303 may be a resistive, an acoustic, a capacitive, an infrared or a force-sensitive touchscreen, or any combination thereof.

A rigid spacer 305 is provided underlaying the non-touch sensitive periphery of the touchscreen panel 303, the rigid spacer 305 being securely disposed in contact with the non-touch sensitive periphery of the touchscreen panel 303 by application of an adhesive layer 304. Rigid spacer 305 is typically fabricated of a rigid material, such as a thermoset or thermoplastic material or any other suitable material as will occur to those of skill in the art, and functions to distribute the sealing pressure, more evenly, around the periphery of touchscreen panel 303 to enhancing the rigidity of touchscreen panel 303 (and display screen 307) with respect to bending or twisting forces.

A compliant layer 306 is provided underlaying rigid spacer 305, the compliant layer 306 disposed in contact with rigid spacer 305. Compliant layer 306 can be fabricated from any suitable compliant or resilient material, as will be apparent to those of skill in the art, including closed celled foams, gels, silicone or silicone-like materials and/or a thermo-plastic elastomer.

A display screen 307 is provided underlaying compliant layer 306, the display screen 307 having a generally planar display portion provided to directly underlay the touch-sensitive region of the touchscreen.

Compliant layer 306 in conjunction with rigid spacer 305 described above provide some degree of impact-resistance for display screen 307 during any shock or impact to the touchscreen display module 222. Consequently, an optimal thickness of rigid spacer 305 will determine the shock-resistance ability. While a thick rigid spacer 305 results in better shock-resistance capability, if rigid spacer 305 is too thick, this can result in display distortions when viewing display screen 307.

In contrast, a too thin rigid spacer 305 compromises the shock-resistant properties of the display screen 307. It is contemplated that drop or shock tests in conjunction with viewing of display quality across a selection of thicknesses of rigid spacer 305 can be used to empirically determine a desired thickness for rigid spacer and that this desired thickness will vary depending upon a variety of factors including the display screen 307, the touchscreen 303 and the uses to which device 100 will be put. It is understood that the selection of an appropriate thickness for rigid spacer 305 will be within the normal skill of those of skill in the art, after reference to this disclosure.

Touchscreen display module 222 further comprises a base bezel portion 308 and a top bezel portion 301 which are adapted to securely frame the display screen 307, the compliant layer 306, the rigid spacer 305, and the touchscreen panel 303 within a module frame 309 and top bezel 301 is fastened to module frame 309 to complete assembly of touchscreen display module 222.

Module frame 309 is preferably formed of substantially high strength material and, in a present embodiment, is a cast magnesium alloy member, although any other material, such as will occur to those of skill in the art, can be employed. For example, zinc alloys, glass-filled plastics and other materials can be employed if desired. Module frame 309 adds additional resistance to twisting or bending forces being applied to display 307 or touchscreen 303 and provides increased drop and/or impact resistance.

Preferably, a spring member 310 is located between base bezel portion 308 and display screen 307 when touchscreen display module 222 is being assembled. Spring member 310 compensates for a small amount of manufacturing tolerance stack up within touchscreen display module 222 and assists in maintaining positive contact between touchscreen 303 and top bezel 301 (and sealing layer 302, described below, if present) in the event of a drop of, or impact to, touchscreen display module 222.

Spring member 310 can also provide some amount of isolation of radio frequency and/or electromagnetic noise between electronic components (such as microprocessor 238 or radio frequency communication subsystem 211) and display 307 and touchscreen 303. In a presently preferred embodiment, spring member 310 is fabricated from a copy alloy and is connected to a suitable electrical ground (not shown) within mobile device 100.

The touchscreen display module 222 may further include a sealing layer 302 interposed between the non-touch sensitive periphery of the touchscreen panel 303 and the top bezel portion 301. The sealing layer 302 is preferably composed of a chemical-resistant, dust-resistant and shock-resistant compliant material, such as a rubber, a silicone rubber or an elastomer-based compound.

Still with regard to FIG. 3, the structure provided also allows for severability of the touchscreen panel 303 and display screen 307 portions during repair of the touchscreen display module 222. This enhances the practicability and economics of replacing individual components during repair of a damaged touchscreen display module 222.

Although a mobile device has been used to establish a context for disclosure herein, it is contemplated as having much wider applicability within the field of touchscreen display devices. Furthermore, the disclosure herein has been described with reference to specific exemplary embodiments; however, varying modifications thereof will be apparent to those skilled in the art without departing from the scope of the invention as defined by the appended claims.

What is claimed is:

1. A touchscreen display module for use in a graphical user interface of a mobile device comprising:
    a touchscreen panel having a generally planar disposition, the touchscreen panel comprising a touch-sensitive region surrounded by a non-touch sensitive periphery, the touch-sensitive region comprising a substantial portion of the touchscreen panel;
    a rigid spacer having a continuous perimeter shaped to underlay only the non-touch sensitive periphery of the touchscreen panel, the rigid spacer securely attached only to the non-touch sensitive periphery of the touchscreen panel by an adhesive layer such that any portion of the rigid spacer is prevented from underlaying the touch-sensitive region;
    a compliant layer having a continuous perimeter underlaying the rigid spacer, the compliant layer disposed in contact with the rigid spacer;
    a display screen underlaying the compliant layer, the display screen having a generally planar display portion provided to directly underlay the touch-sensitive region of the touchscreen; and
    a touchscreen housing assembly comprising a base bezel portion, a top bezel portion and a module frame, the touchscreen housing assembly adapted to securely frame the display screen, the compliant layer, the rigid spacer, and the touchscreen panel.

2. The touchscreen display module of claim 1 further comprising a sealing layer interposed between the non-touch sensitive periphery of the touchscreen panel and the top bezel portion.

3. The touchscreen display module of claim 1 wherein the compliant layer is a selected from the group of materials consisting of closed celled foam, a gel, a silicone or silicone-like material or a thermo-plastic elastomer.

4. The touchscreen display module of claim 1 further including a spring member acting between the display screen and the base bezel portion to bias the display screen towards the top bezel portion.

5. The touchscreen display module of claim 4 wherein the spring member is made of a conductive material to inhibit electromagnetic interference between the touchscreen module and the surrounding environment.

6. A mobile device comprising:
    a processor;
    a non-transitory memory coupled to the processor having instructions stored therein for execution by the processor; and
    a touchscreen display module for displaying graphical images, the touchscreen display module further comprising:
        a touchscreen panel having a generally planar disposition, the touchscreen panel comprising a touch-sensitive region surrounded by a non-touch sensitive peripheral region, the touch-sensitive region comprising a substantial portion of the touchscreen panel;
        a rigid spacer having a continuous perimeter shaped to underlay only the non-touch sensitive peripheral region of the touchscreen panel, the rigid spacer securely attached only to the non-touch sensitive periphery of the touchscreen panel by an adhesive layer such that any portion of the rigid spacer is prevented from underlaying the touch-sensitive region;

a compliant layer having a continuous perimeter underlaying the rigid spacer, the compliant layer disposed in contact with the rigid spacer;

a display screen underlaying the compliant layer, the display screen having a generally planar display portion provided to directly underlay the touch sensitive region of the touchscreen; and a touchscreen housing assembly comprising a base bezel portion, a top bezel portion and a module frame, the touchscreen housing assembly adapted to securely frame the display screen, the compliant layer, the rigid spacer, and the touchscreen panel.

7. The mobile device of claim 6 further comprising a sealing layer interposed between the non-touch sensitive periphery of the touchscreen panel and the top bezel portion.

8. The mobile device of claim 6 wherein the touchscreen display module further comprises a spring member acting between the display screen and the base bezel portion to bias the display screen towards the top bezel portion.

9. The mobile device of claim 8 wherein the spring member is made of a conductive material to inhibit electromagnetic interference between the touchscreen module and the processor and memory of the mobile device.

10. A method for assembling a touchscreen display module comprising:

providing a touchscreen panel having a generally planar disposition, the touchscreen panel comprising a touch-sensitive region surrounded by a non-touch sensitive periphery, the touch-sensitive region comprising a substantial portion of the touchscreen panel;

providing a rigid spacer having a continuous perimeter shaped to underlay only the nontouch sensitive periphery of the touchscreen panel, the rigid spacer securely attached only to the non-touch sensitive periphery of the touchscreen panel by an adhesive layer such that any portion of the rigid spacer is prevented from underlaying the touch-sensitive region;

providing a compliant layer having a continuous perimeter underlaying the rigid spacer, the compliant layer disposed in contact with the rigid spacer;

providing a display screen underlaying the compliant layer, the display screen having a generally planar display portion provided to directly underlay the touch sensitive region of the touchscreen; and providing a touchscreen housing assembly comprising a base bezel portion, a top bezel portion and a module frame, the touchscreen housing assembly adapted to securely frame the display screen, the compliant layer, the rigid spacer, and the touchscreen panel.

11. The method of claim 10 further comprising providing a sealing layer interposed between the non-touch sensitive periphery of the touchscreen panel and the top bezel portion.

12. The method of claim 10 further comprising providing a spring member acting between the base bezel portion and the display screen to bias the display screen towards the top bezel portion.

13. The method of claim 12 wherein the spring member is formed of an electrically conductive material and is connected to an electrical ground.

\* \* \* \* \*